United States Patent [19]
Reese

[11] Patent Number: 5,242,588
[45] Date of Patent: Sep. 7, 1993

[54] FILTER UNIT ASSEMBLY

[76] Inventor: Ronald K. Reese, 409 Birch St., Bellevue, Id. 83313

[21] Appl. No.: 766,335

[22] Filed: Sep. 26, 1991

[51] Int. Cl.$^5$ .................. B01D 29/25; B01D 35/30; B01D 46/02; B01D 50/00
[52] U.S. Cl. .................. 210/232; 210/237; 210/238; 210/250; 210/416.1; 210/406; 210/448; 15/143.1; 15/347; 15/350; 15/411; 55/359; 55/357; 55/373; 55/374; 55/378; 55/DIG. 3
[58] Field of Search ............. 55/DIG. 3, 357, 356, 55/373, 480, 359, 374, 378, 361; 15/143.1, 347, 410, 411, 350, 352, 353; 210/232, 237, 238, 241, 250, 416.1, 464, 446, 448, 450, 406

[56] References Cited

U.S. PATENT DOCUMENTS

| | | | |
|---|---|---|---|
| 1,847,352 | 3/1932 | McClatchie | 55/DIG. 3 |
| 2,177,588 | 7/1936 | Genell | 55/DIG. 3 |
| 2,226,630 | 12/1940 | McCord | 55/DIG. 3 |
| 2,237,499 | 4/1941 | Osterdahl | 55/DIG. 3 |
| 2,520,589 | 8/1950 | White | 55/DIG. 3 |
| 2,742,105 | 4/1956 | Dow | 55/DIG. 3 |
| 2,759,228 | 8/1956 | Gordon | 55/DIG. 3 |
| 2,849,080 | 8/1958 | Enright | 55/DIG. 3 |
| 3,132,364 | 5/1964 | Oxley | 15/350 |
| 3,257,784 | 6/1966 | Grellsson | 55/DIG. 3 |
| 4,257,789 | 3/1981 | Leinfelt | 55/DIG. 3 |
| 4,469,498 | 9/1984 | Fish | 55/DIG. 3 |
| 4,549,329 | 10/1985 | St. Clair | 15/353 |
| 4,818,398 | 4/1989 | Lott | 210/448 |
| 4,831,685 | 5/1989 | Bosyj | 55/DIG. 3 |
| 4,842,737 | 6/1989 | Reed | 210/448 |
| 4,986,912 | 1/1991 | Fisch | 210/448 |
| 5,006,243 | 4/1991 | Arnaud | 210/448 |

FOREIGN PATENT DOCUMENTS

| | | | |
|---|---|---|---|
| 277114 | 12/1987 | Japan | 210/448 |
| 674712 | 7/1990 | Liechtenstein | 210/448 |

OTHER PUBLICATIONS

Mr. Steam Advertisement "Don't You Just Hate . . . ".

Primary Examiner—Thomas M. Lithgow
Attorney, Agent, or Firm—David P. Gordon

[57] ABSTRACT

Filter unit assembly located at an operator-designated position is provided for enabling fluid flow through a removable mesh filter and ready disconnectibility from a vacuum line with the avoidance of liquid spillage from the filter unit assembly. The filter unit has a chamber which is open at one end and closed at its other end except for an outlet conduit displaced from the longitudinal axis of the chamber, first and second outwardly extending grip means which are displaced from each other about the longitudinal axis of the chamber, first and second supports for permitting the unit to rest in different stable positions, and a cap member for which engages and closes the front end of the chamber and has an axial inlet.

16 Claims, 8 Drawing Sheets

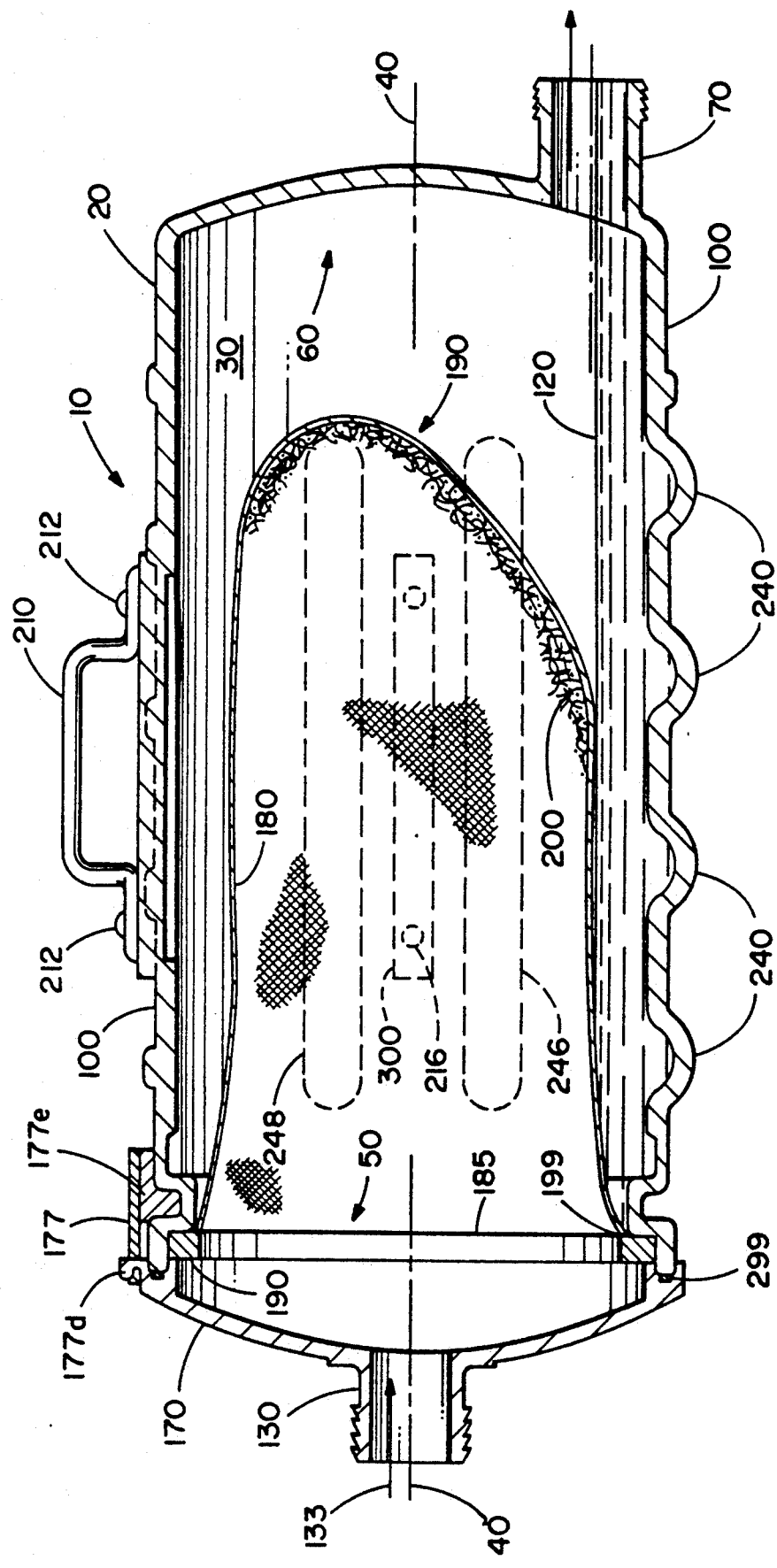

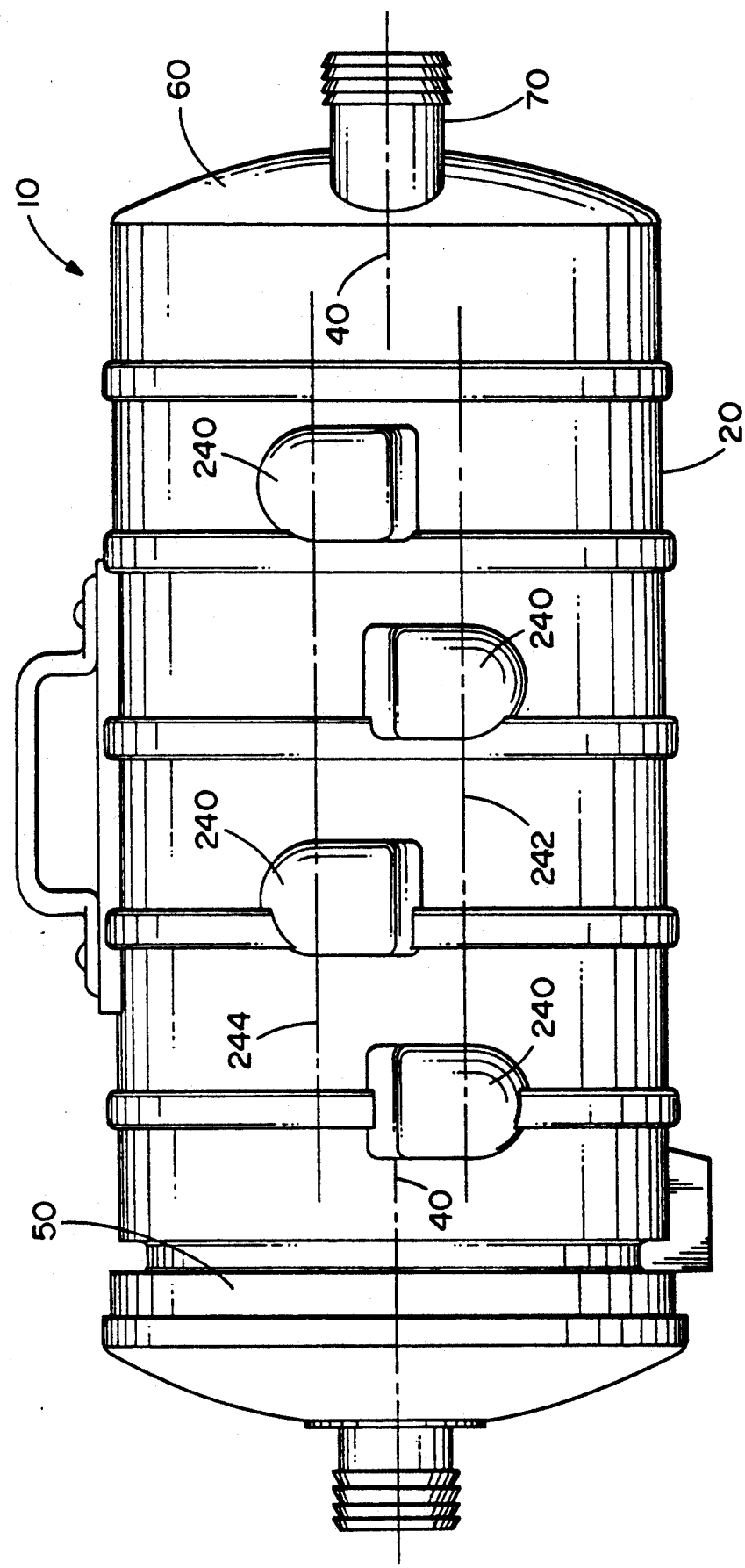

FILTER UNIT ASSEMBLY

BACKGROUND OF THE INVENTION

This invention relates to a waste filter unit assembly for commercial cleaning operations. More particularly the present invention relates to a filter unit assembly which is removably connectible in a vacuum line to enable ready cleaning or replacement of a filter.

The carpet cleaning industry utilizes a variety of different technologies, but for the most part a relatively few basic methods are practiced at present. These practices include shampooing, various dry cleaning practices, and hot water extraction. Hot water extraction, or "steam cleaning" in its various forms, is by far the most widespread.

At the present time there are estimated to be thousands of firms involved in this business in North America. These firms typically utilize one or both of truck mounted and portable extraction units. The advantage of a truck mounted unit is the higher power which is generated by the internal combustion system. Higher power advantageously permits higher temperature and higher pressure cleaning. Where truck mounted units cannot be used, such as in high rise apartments, portable units which run off electric power are typically used. The other advantage of a portable unit is its lower cost relative to the truck mounted unit.

A typical commercial hot water extraction unit includes: a high pressure pump; a vacuum unit; a power supply; a delivery system; and a waste storage container.

The cleaning process is typically carried out by mixing heated water with a detergent solution and applying the mixture to textile or other surfaces under pressure. The solution, now containing soluble soils and solid waste is removed from the surface by vacuum and directed to a waste storage receptacle. Unless there is filtering, however, the solid waste will be disadvantageously deposited in the waste storage receptacle. Thus, without filtering, there is no choice but to hose out the waste tank frequently which is an inconvenient and messy task. Consequently, truck mounted commercial units often include a system having a filter for filtering out the solids. The customary procedure (if any) for cleaning or replacing a filter loaded with solids however is also invariably messy and usually results in the dripping and spilling of soiled solution in the truck during filter cleaning/replacement.

SUMMARY OF THE INVENTION

It is therefore an object of the present invention to provide a filter unit assembly is removably installed between a vacuum element and waste storage, and which can be readily positioned to avoid spillage or dripping when disengaged for removal and cleaning of a reusable filter.

It is a further object of the invention to provide a filter unit assembly which enables enhanced flow of liquid soils therethrough, and which is designed to permit easy manipulation and cleaning.

In accord with the objects of the invention a filter unit assembly is provided for use with commercial cleaning operations which involve the use of a vacuum element such as a wand of the like. The filter unit assembly gathers from a rug, carpet, upholstered furniture, or the like, a cleaning liquid bearing soluble soils and solid waste, e.g. hair, lint, thread, grit and the like which is drawn through a vacuum line for collection and disposal. The filter unit assembly of the present invention is suitably removably installed between the inlet of the vacuum element and the waste disposal unit, e.g. in a vacuum line the exact site of which is up to the user's discretion.

The filter unit assembly of this invention generally comprises a housing surrounding an axially extending chamber and a cap member. The housing is open at a first end and closed at a second end except for an outlet conduit displaced from the axis of the chamber and adjacent the outside of the housing. A first grip means engaging the outside of the housing is provided substantially in a plane which is common with the outlet conduit. A first housing support integral with the outside of the housing enable stable resting of the housing when on a generally planar surface. Second grip means also engaging the outside of the housing, but angularly displaced about the axis of the chamber from the first grip means is provided in order to permit the filter unit assembly to be carried in a second position where dripping is substantially eliminated due to rotation of the outlet conduit. A second housing support means also integral with the outside of the housing is also preferably provided and is arranged opposite to the second grip means for enabling stable resting of the housing when on a generally planar surface. The cap member is arranged to disengage the housing at its open first end. When the cap member is engaged with the first end of the housing, the first end of the housing is closed except for an inlet conduit in substantial alignment with the axis of the chamber. Because the cap member can be disengaged, the housing is adapted to receive a removable filter means. The filter means is arranged to sit on a lip in the first end of the housing and to extend into the chamber thereof The cap member when secured to the housing by the cap member prevents movement of the filter means.

In the filter unit assembly of the invention the outlet conduit means is below the axis of the chamber surrounded by the housing when the housing is supportingly held at its first grip means and/or standing on its first housing support means. When the housing is supportingly held at its second grip means and/or is standing on its second housing support means, the outlet conduit means is at a level closer to the axis of said chamber.

Additional objects and advantages of the invention will become apparent to those skilled in the art upon reference to the detailed description taken in conjunction with the provided figures.

BRIEF DESCRIPTION OF THE DRAWINGS

FIG. 2 is a sectional view of the unit of FIG. 1(A);

FIG. 2(A) is a bottom view of the device of FIG. 1(A);

DETAILED DESCRIPTION OF INVENTION

Figure 1A:
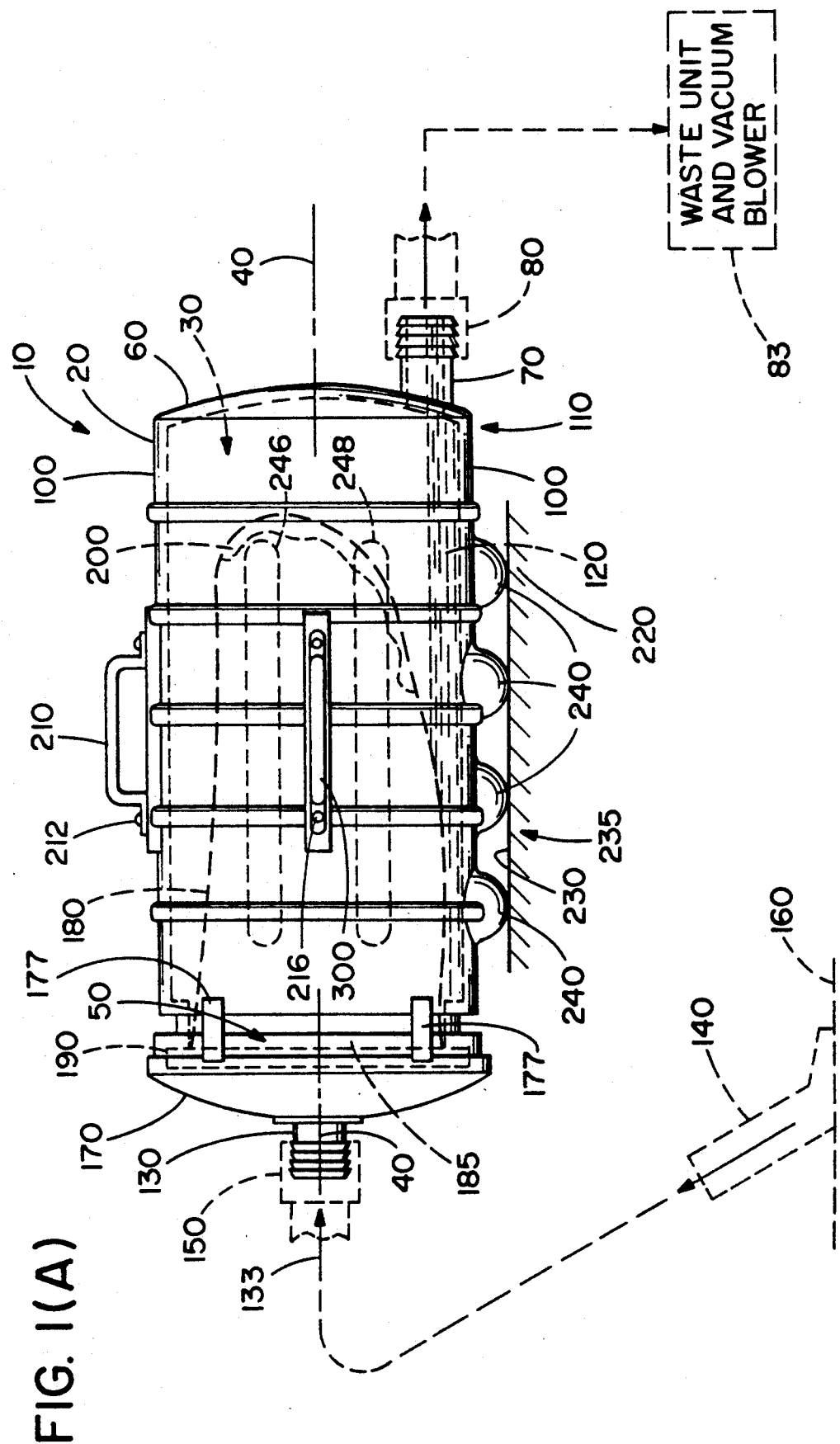
FIG. 1(A) is an elevational view of a filter unit assembly of the present invention.
Figure 1B:
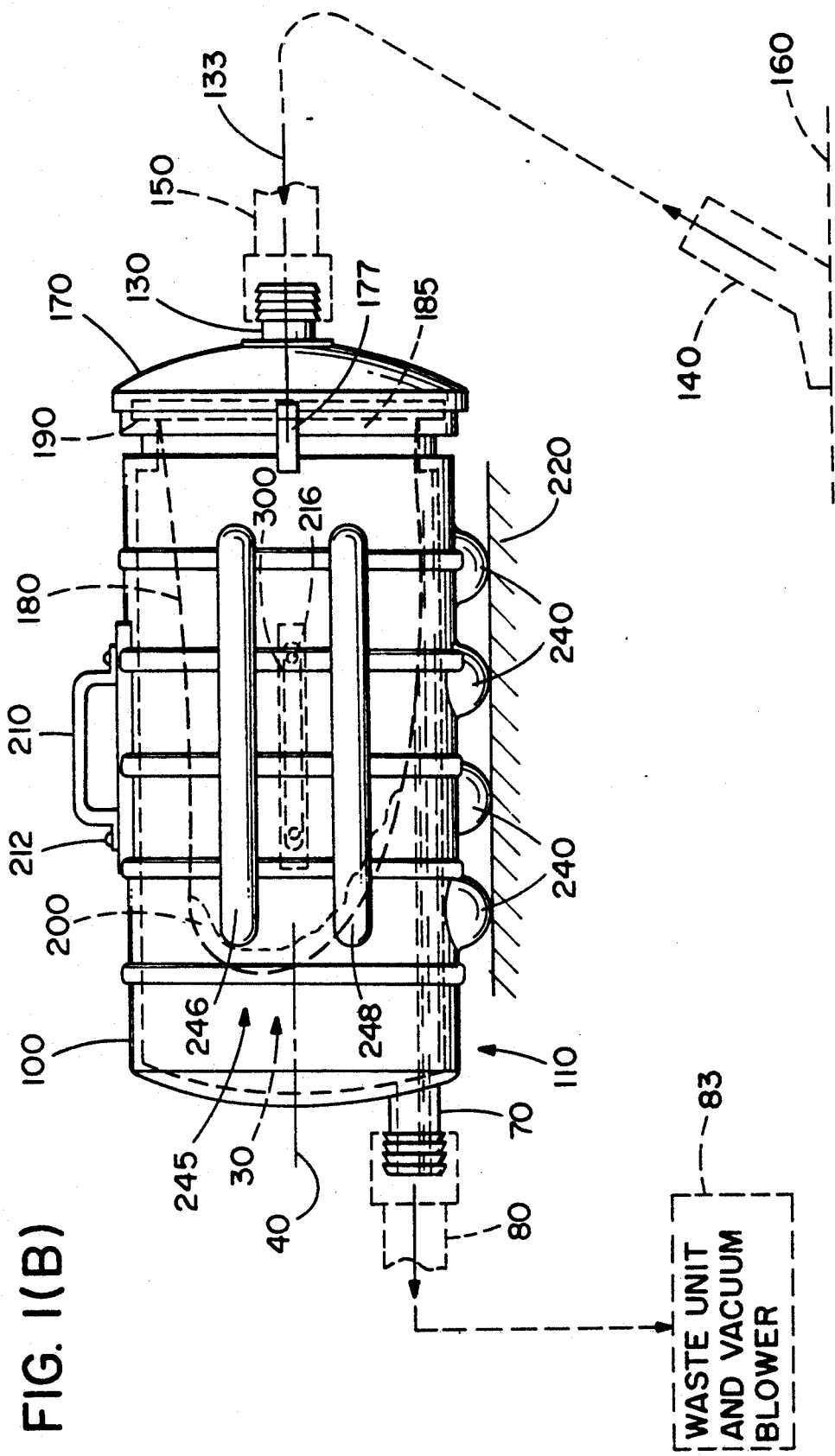
FIG. 1(B) is an elevational view of the opposite side of the assembly shown in FIG. 1(A)

With reference to FIG. 1(A) a filter unit assembly of an embodiment of the invention is shown at 10 and comprises a housing 20 surrounding an axially extending chamber 30, and a cap member 170 which engages the housing 20. The longitudinal axis of chamber 30 and housing 20 is indicated at 40. The housing 20 is suitably made of a strong hard plastic such as high density polyethylene and manufactured by conventional molding techniques. Housing 20 is open at a first end 50 as shown more clearly in FIG. 2 and is closed at its second end 60 except for outlet conduit 70 which can be detachably connected to a waste unit (not shown) by means of a conventional quick disconnect type connector 80 (see FIG. 1A), e.g., a two inch flexible G-vac hose or a typical two inch hose cuff. In this manner, the filter unit assembly 10 can be located in the line at a location desired by the user; anywhere from near the wand to in the truck. The outlet conduit 70 of chamber 30 is located adjacent the lateral periphery 100 of housing 20 as indicated at 110. In the position illustrated in FIG. 1(A) and FIG. 2, outlet conduit 70 is displaced vertically below the longitudinal axis 40 (as indicated at 45 in FIG. 2) and is in its lowermost position. In this position, water solution with soils, shown at 120 in chamber 30, which is received into chamber 30 via centrally positioned inlet conduit 130, after passing through replaceable filter 180 is readily removed from chamber 30 via outlet conduit 70 and transferred to a waste unit indicated at 83. Also, with the provided inlet and outlet, the liquid and air flow through the filter unit does not include any ninety degree turns which might restrict or impede the flow and lessen the effectiveness of the unit.

Figure 5:
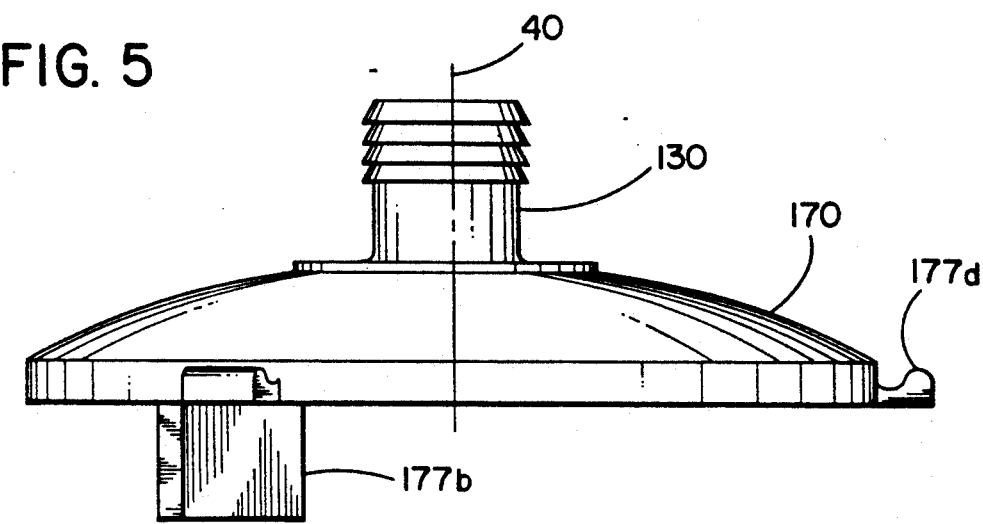
FIG. 5 is a front elevational view of the removable cap member of the unit of FIG. 1(A).
Figure 4:
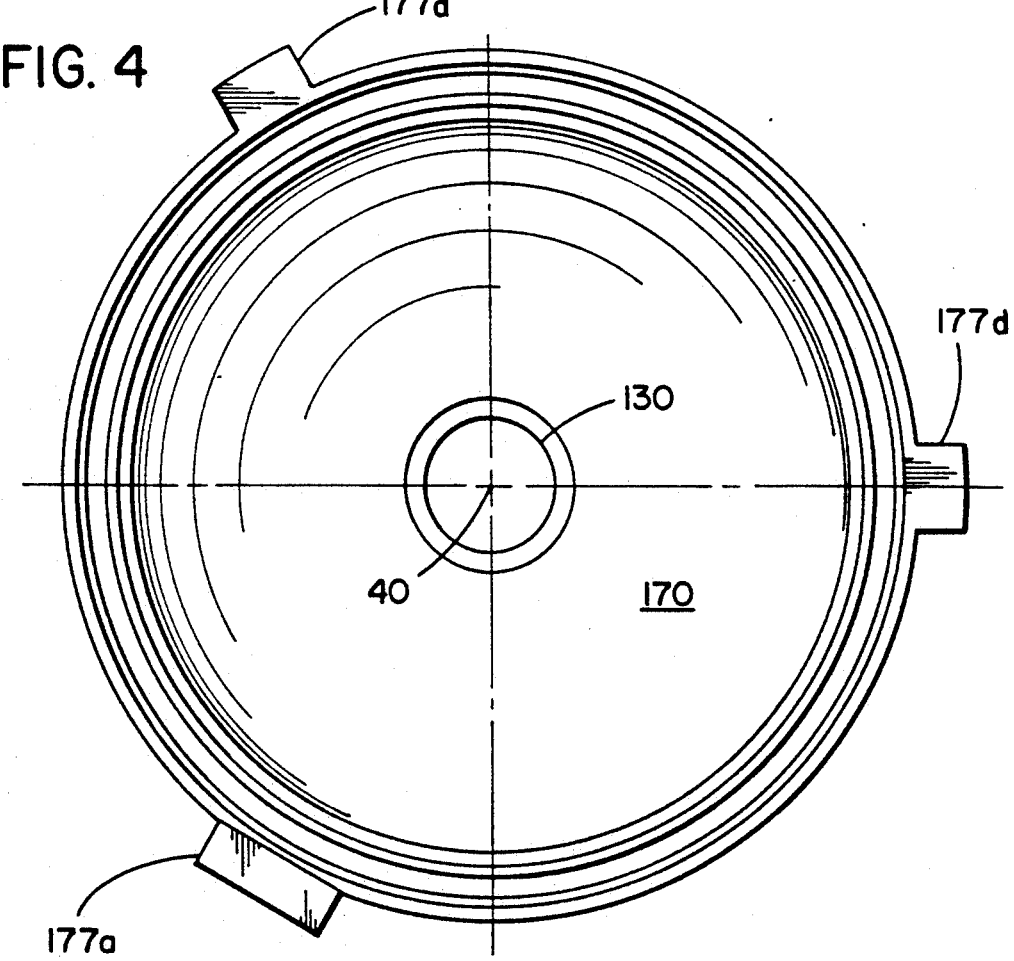
FIG. 4 is a side elevational view of the removable cap member of the unit of FIG. 1(A)

Inlet conduit 130 is centrally positioned in removable cap member 170 (shown in more detail in FIG. 5) and in coaxial alignment with chamber 30 and is detachably connected to a vacuum element, e.g. wand 140, by means of a conventional quick disconnect type connector 150. Vacuum wand 140 draws a water solution containing soils and also containing solid waste such as hair, lint, grit and the like from a fabric or textile 160 wetted with cleaning solution. The soils-solids mixture passes through axially aligned inlet conduit 130, as indicated at 133, of hinged cap member 170 (hinge 177b, 177a being provided as seen in FIGS. 4 and 5 and attached to the cap member 170 and housing 20 with screws or rivets, not shown). A cleanable filter bag 180, e.g. formed of nylon, metal, or other mesh, having its open end 185 attached to a rigid ring 190, extends in chamber 30 with the rigid ring 190 sitting on internal lip 199 of the housing 20. Cap member 170 is caused to sealingly engage housing 20 (with gasket 299 of cap member 170 engaging the rim of housing 20) by manipulation of conventional latches 177. As seen in FIG. 2, latches 177 are attached to latch receivers 177e (such as by screws not shown) which sit in an indentation opposite lip 199. To cause sealing of cap member 170 with housing 20, latches 177 are extended over latch plates 177d located at the front end of housing 20 as indicated in FIG. 2. With the cap closed, the filter bag 180 is held in and extends into housing 20 through open end 50 with the closed end portion 190 of filter bag 180 being within chamber 30. Filtered solution 120 passes through the filter bag 180 as previously described, and solid and semi-soluble waste, e.g. hair, lint, grit, scum, and the like accumulates as a wet soggy mass 200 within filter bag 180.

Housing 20 has a first hand grip 210 suitably attached to the housing by screws 212 or suitably molded into the housing. First hand grip 210 is provided so that the filter unit assembly 10 can be moved about during the vacuum cleaning operation. In addition, first housing support means 235 comprising short leg members 240 are suitably molded into the housing such that the filter unit assembly 10 retains the position shown in FIG. 1(A) and FIG. 3 when the unit is supported by the first housing support means 235 and rests on a generally planar substrate 220.

Figure 3:
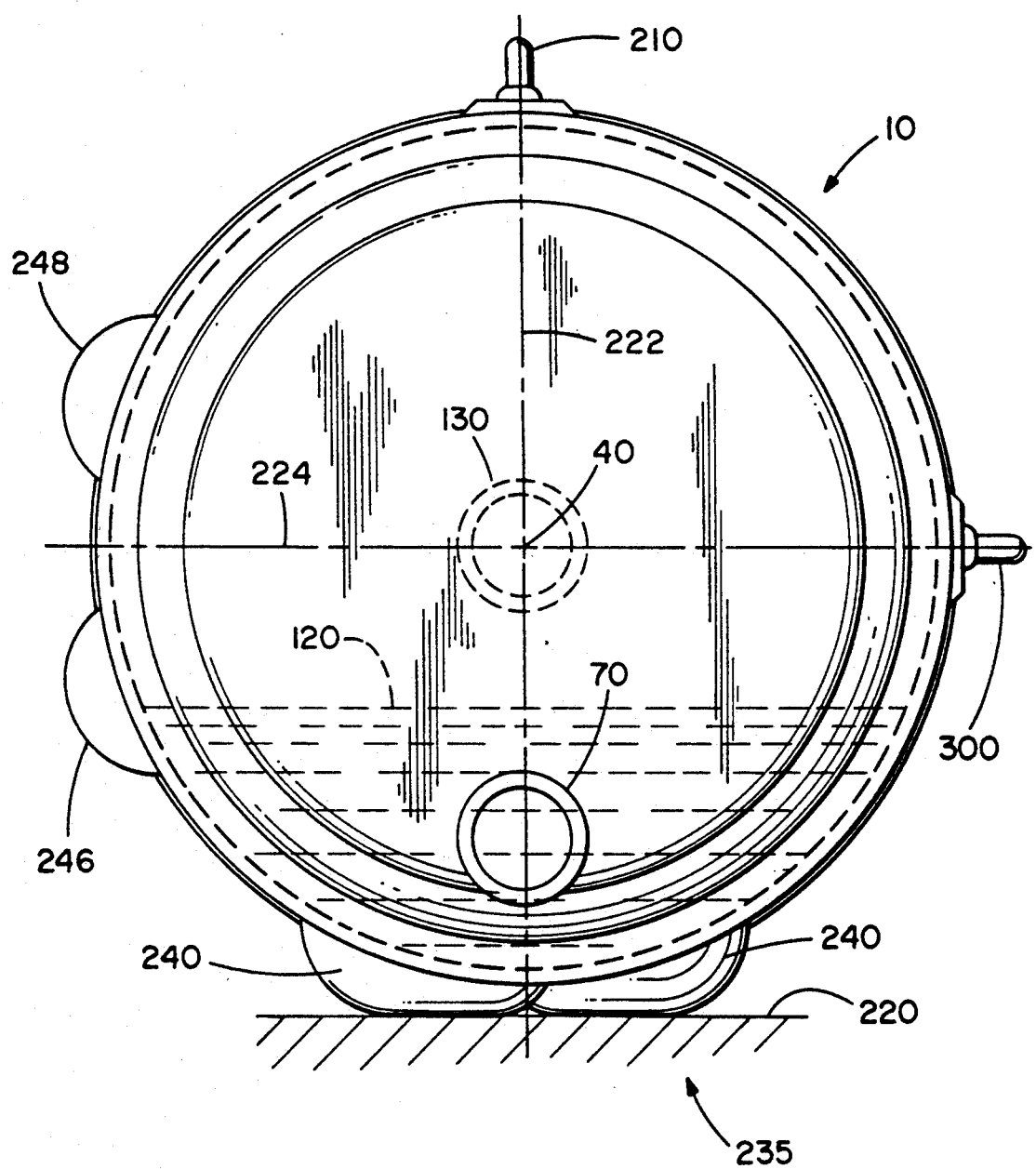
FIG. 3 is a side elevational view of the unit of FIG. 1(A)

Filter unit assembly 10 is completely portable during cleaning operations and can be hand carried by a first grip handle means 210 which is in substantially the same vertical plane 222 as outlet conduit 70 as shown in FIG. 3. During operation the filter unit 10 can be set down to rest on a generally planar surface 220 by utilizing support means 230 having four shortened separate leg members 240 arranged opposite the first grip member 210 in spaced apart rows 242, 244 as shown in FIG. 2(A), in which the leg members of the opposite rows are out of register. Each of the rows 242, 244 extends along most of the axial length of the housing 20 as shown in FIG. 2(A). The leg supports 240 are preferably integral with housing 20, as shown in FIG. 2, and are formed in the course of molding.

Figure 1C:
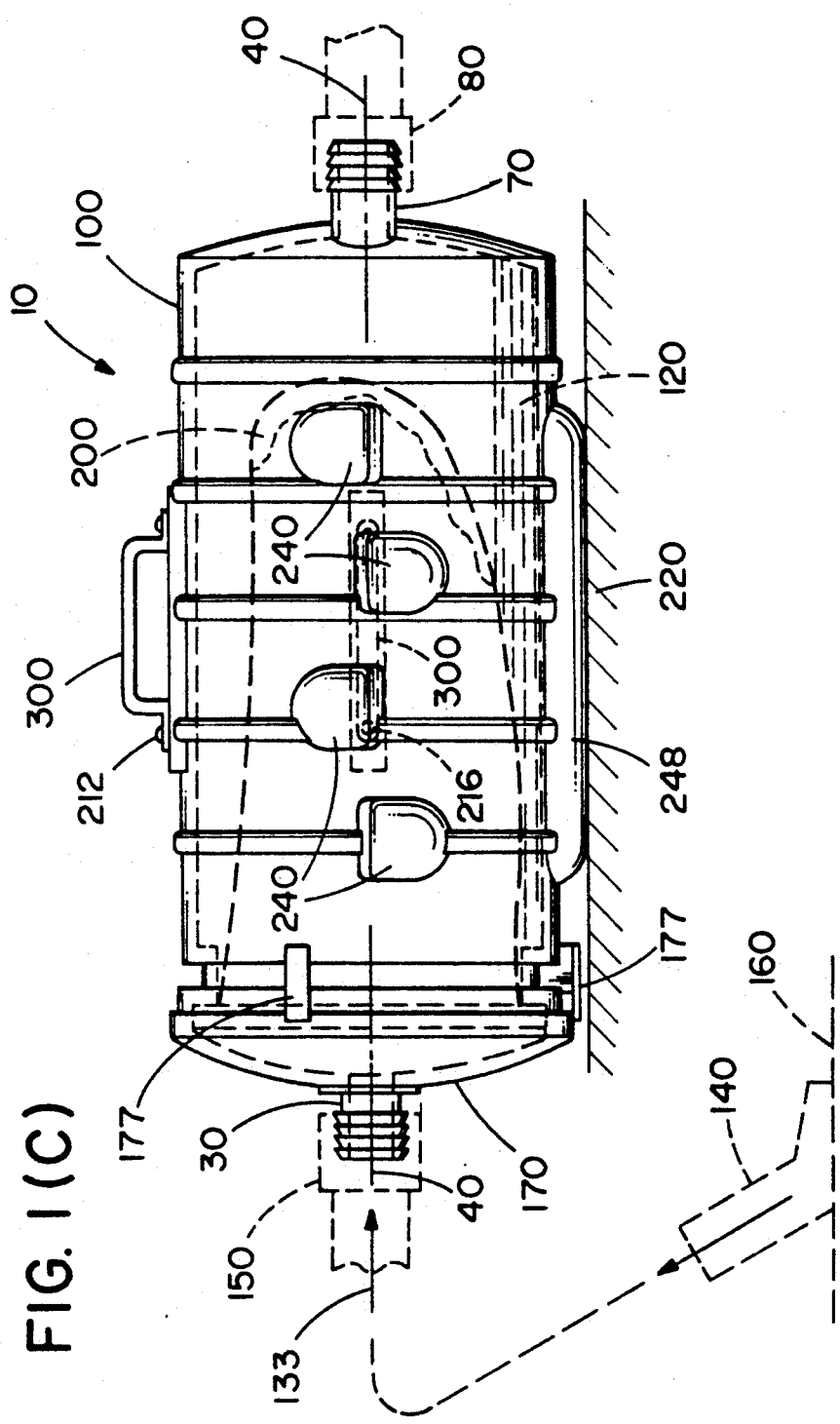
FIG. 1(C) is an elevational view of the unit of FIG. 1(A) rotated 90° about its longitudinal axis.
Figure 3A:
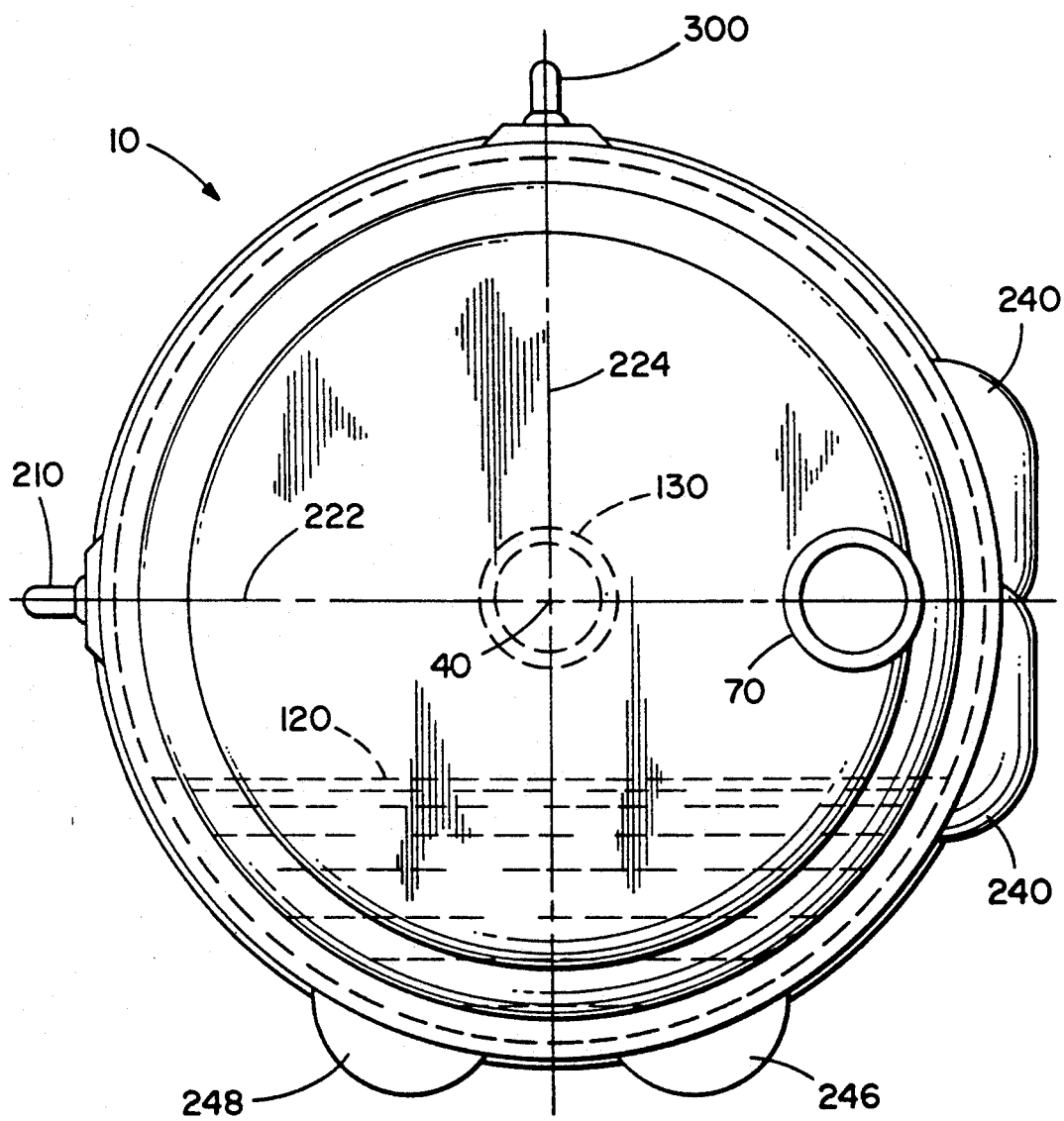
FIG. 3(A) is a right side elevational view of the unit of FIG. 1(C)

When solid waste mass 200 in the removable mesh filter 180, with reference to FIG. 1(A) and 2, reaches a level at which cleaning of the filter 180 is required, filter unit assembly 10 is lifted by second hand grip means 300. Second hand grip means 300 is suitably attached to housing 20 by screws 216, although it could also be molded as an integral part of housing 20. The second hand grip means 300 is angularly displaced by about 90° from first grip means 210, as shown in FIG. 1(A) and is in a common plane 224 with inlet conduit 130 and longitudinal axis 40 as shown in FIG. 3. Upon lifting at second grip means 300, filter assembly unit 10 rotates under force of gravity to the position shown in FIG. 1(C) and FIG. 3(A) so that liquid soils 120 are no longer adjacent the outlet conduit 70, which also has rotated 90° to position shown in FIGS. 1(C) and 3(A). With the filter assembly unit 10 in such position, the unit 10 can be rested on a generally planar surface 220 and supported by second support means 245 which are positioned opposite grip means 300 and comprise a pair of parallel opposed runner elements 246, 248. Runners 246, 248 are symmetrical about axis 40 and extend along most of the length of housing 20. The filter unit 10 can then be disconnected from connectors 150 and 80 at its inlet conduit 130 and outlet conduit 70 respectively, and transported by hand to a suitable location for removal and cleaning or replacement of filter 180 without spillage or dripping of water soils 120 due to the position achieved by outlet conduit 70 as shown in FIG. 1(C) and FIG. 3(A).

There has been described and illustrated herein a waste filter unit. While particular embodiments of the invention have been described, it is not intended that the invention be limited thereto, as it is intended that the invention be as broad in scope as the art will allow and that the specification be read likewise. Thus, while the hand grips were described as being attached by screws to the housing, while the housing support means were described as being part of the molded housing itself, it will be appreciated that the hand grips could be molded as part of the housing, while the housing support means could be attached by screws. Also, while specific sized quick connect/disconnect means were described for coupling the inlet and outlet of the filter assembly to a line, it will be appreciated that other size lines could be accommodated. Further, while the cap member was described as being hinged to the housing and secured by two latches, it will be appreciated that a different number of securing means could be used, and that the cap member could be completely removable, and other mechanisms such as, e.g., providing the cap with an internal thread and the housing with an external thread could be utilized to removingly, but sealingly mate the cap and the housing. Further yet, while the housing was described as being manufactured out of high density polyethylene and having a circular cross-section, it will be appreciated that different materials and different shapes can be used. Likewise, while the filter unit was described as being used in conjunction with a filter made of nylon mesh or the like, it will be appreciated that the filter unit of the invention can be used with an extremely fine mesh for dry cleaning applications. It will therefore be appreciated by those skilled in the art that yet other modifications could be made to the provided invention without deviating from its spirit and scope as so claimed.

I claim:

1. An apparatus for use with a removable filter means housed therein, said apparatus comprising:
   a longitudinally extending housing defining an axis, said housing having a closed lateral periphery surrounding an axially extending changer, said housing being open at a first end and substantially closed at a second end, said second end having an outlet conduit displaced from the longitudinal axis of the housing;
   a first grip means extending from an outer surface of said housing and being arranged substantially in a first plane which is common with said outlet conduit;
   first housing support means on said outer surface of said housing and arranged opposite to said first grip means, said first housing support means for enabling stable resting of said housing on a generally planar surface when said first housing support means is in contact with said generally planar surface;
   second grip means extending from said outer surface of said housing, said second grip means being arranged substantially in a second plane angularly displaced from the first grip means about said longitudinal axis of said chamber;
   a cap member having an inlet conduit in substantial alignment with the axis of said housing, said cap member having engaging means for disengagably engaging and closing said first end of said housing, whereby said engaging means con be disengaged to open said first end of said housing, wherein
   said outlet conduit means is below the horizontal plane of the midline of said housing when said housing is supportingly held at said first grip means, and said outlet conduit is at a level closer to said horizontal plane of the midline of said housing when said housing is supportingly held at said second grip means, and
   said housing having means for receiving said removable filter means.

2. An apparatus in accordance With claim 1, further comprising:
   second housing support means on said outer surface of said housing and arranged opposite to said second grip means for enabling stable resting of said housing on a generally planar surface when said second housing support is in contact with said surface.

3. An apparatus in accordance with claim 1 wherein said housing defines said chamber and said chamber is substantially cylindrical in shape.

4. An apparatus in accordance with claim 1 wherein the housing has the lateral periphery which is generally cylindrical.

5. An apparatus in accordance with claim 1 wherein said first housing support means comprise two spaced apart rows of separate shortened spaced apart leg members integral with said housing, each said row extending along most of the axial length of said housing and being symmetrical about said longitudinal axis of said housing.

6. An apparatus in accordance with claim 5 wherein said shortened legs of said respective rows are out of register.

7. An apparatus in accordance with claim 2 wherein said housing defines said chamber and said chamber is substantially cylindrical in shape and said housing has the lateral periphery which is generally cylindrical.

8. An apparatus in accordance with claim 7 wherein said first housing support means comprise two spaced apart rows of separate shortened spaced apart leg members integral with said housing, each said row extending along most of the axial length of said housing and being symmetrical about said longitudinal axis of said housing, said shortened legs of said respective rows being out of register.

9. An apparatus in accordance with claim 2 wherein said second housing support means comprise two spaced apart runners integral with said housing with each said runner extending along most of the axial length of the housing and said runners being symmetrically positioned with respect to said longitudinal axis of said housing.

10. An apparatus in accordance with claim 8 wherein said second housing support means comprise two spaced apart runners integral with said housing with each said runner extending along most of the axial length of the housing and said runners being symmetrically positioned with respect to said longitudinal axis of said housing.

11. An apparatus in accordance with claim 1 wherein said means for receiving said filter means comprises an inwardly extending lip formed by said housing adjacent said open first end.

12. An apparatus of claim 11 wherein said filter means comprises on open end filterbag said filter bag having a peripheral ring about its open end, said peripheral ring for sitting on said inwardly extending lip of said housing.

13. An apparatus in accordance with claim 1 further comprising:
   a plurality of latches coupled to said housing for latching said cap member to said housing.

14. An apparatus in accordance with claim 12 further comprising:
   a plurality of latches coupled to said housing opposite said inwardly extending lip for latching said cap member to said housing.

15. An apparatus in accordance with claim 1 wherein said second grip means is angularly displaced by about 90° from said first grip means and is substantially in a common plane with said inlet conduit.

16. An apparatus in accordance with claim 8 wherein said second grip means is angularly displaced by about 90° from said first grip means and is substantially in a common plane with said inlet conduit.

* * * * *